United States Patent
Huang

(10) Patent No.: US 9,315,079 B2
(45) Date of Patent: *Apr. 19, 2016

(54) ADJUSTABLE TIRE PRESSURE DETECTOR

(71) Applicant: SUNG JUNG MINUTE INDUSTRY CO., LTD., Hsinchu County (TW)

(72) Inventor: Wen-Huo Huang, Hsinchu County (TW)

(73) Assignee: SUNG JUNG MINUTE INDUSTRY CO., LTD, Hsinchu (TW)

( * ) Notice: Subject to any disclaimer, the term of this patent is extended or adjusted under 35 U.S.C. 154(b) by 217 days.

This patent is subject to a terminal disclaimer.

(21) Appl. No.: 14/044,167

(22) Filed: Oct. 2, 2013

(65) Prior Publication Data

US 2015/0090024 A1 Apr. 2, 2015

(51) Int. Cl.
*B60C 23/02* (2006.01)
*B60C 23/04* (2006.01)

(52) U.S. Cl.
CPC ......... *B60C 23/0498* (2013.01); *B60C 23/0494* (2013.01)

(58) Field of Classification Search
None
See application file for complete search history.

(56) References Cited

U.S. PATENT DOCUMENTS

| 7,021,133 | B1* | 4/2006 | Hsu | 73/146.8 |
| 2008/0302425 | A1* | 12/2008 | Hettle et al. | 137/227 |
| 2010/0064791 | A1* | 3/2010 | Chuang et al. | 73/146.8 |
| 2010/0064792 | A1* | 3/2010 | Chuang et al. | 73/146.8 |
| 2012/0118057 | A1* | 5/2012 | Rigney et al. | 73/146.8 |
| 2013/0042676 | A1* | 2/2013 | Korus | 73/146.3 |

FOREIGN PATENT DOCUMENTS

TW    M405977    6/2011

* cited by examiner

*Primary Examiner* — Andre Allen
(74) *Attorney, Agent, or Firm* — Muncy, Geissler, Olds & Lowe, P.C.

(57) ABSTRACT

An adjustable tire pressure detector is installed on a tire rim, and includes a detector body, a gas intake nozzle and a gas nozzle assembly member. The detector body includes a housing and a gas nozzle assembly hole. The gas nozzle assembly hole includes two parallel limiting contact surfaces and at least one connecting surface connecting the two limiting contact surfaces. The gas intake nozzle includes two compact surfaces corresponding to and tightly pressing against the limiting contact surfaces, at least one abutting contact surface connecting the compact surfaces and contacting with the connecting surface, and an assembly hole facing the gas nozzle assembly hole. A distance between the two compact surfaces gradually increases from the coupling section towards the gas intake section. The gas nozzle assembly member is coupled with the assembly hole of the gas intake nozzle to fasten the gas intake nozzle onto the detector body.

7 Claims, 10 Drawing Sheets

ADJUSTABLE TIRE PRESSURE DETECTOR

FIELD OF THE INVENTION

The present invention relates to an adjustable tire pressure detector, and particularly to an adjustable tire pressure detector adapt to various types of tire rims.

BACKGROUND OF THE INVENTION

A tire pressure sensor, disposed on a tire rim of a vehicle, constantly monitors the gas pressure and temperature of the tire, and outputs sensed values to a vehicle display device or a vehicle status warning device through wireless transmission. As such, a driver of the vehicle may be informed the tire pressure status in real-time during a driving process, so as to prevent accidents resulted by tire abnormalities.

A tire sensor is usually connected to a gas intake nozzle disposed on an assembly hole of the tire rim. The gas intake nozzle serves as an input end for a user to pump gas into the tire. As sizes of tire rims may vary according to different designs and different vehicle types, in order to securely attach a tire pressure sensor on a tire rim after installing the tire pressure sensor, manufacturer needs to perform structural adjustments to the tire pressure sensor for each vehicle model or each uniquely designed tire rim individually. Consequently, production costs are increased. In view of the above issue, a tire pressure sensor capable of appropriately adjusting according to the shape of a tire rim is proposed. For example, as a tire pressure sensor disclosed in the Taiwan Utility Model No. M405977, a gas intake nozzle thereof is disposed with an arched outer adjustment surface. Besides, the tire pressure sensor is further disposed with an arched inner adjustment surface at a position connecting to the gas intake nozzle. The outer adjustment surface and the inner adjustment surface are complementary in shape to perform relative sliding movements. In the above disclosure, the gas intake nozzle is fastened on the tire pressure sensor by penetrating a screw bolt through the outer adjustment surface of the gas intake nozzle and the inner adjustment surface of the tire pressure sensor. Thus, through the structural feature the above disclosure tire pressure sensor becomes suitable for any desired tire rim. However, since the gas intake nozzle is able to slide relatively to the tire pressure sensor and the two are fastened merely by one single screw bolt, jittering during a driving process may cause the gas intake nozzle to waver relatively to the tire pressure sensor. Under a long-term use, the gas intake nozzle is prone to loosening or even disengagement from the tire pressure sensor.

SUMMARY OF THE INVENTION

Therefore the primary object of the present invention is to provide an adjustable tire pressure detector that can be installed on different types of tire rims.

To achieve the above object, an adjustable tire pressure detector is provided by the present invention. The adjustable tire pressure detector is installed on a tire rim. The tire rim includes two fastening sections at two sides to engage with a tire bead of a tire, a connecting section connecting the two fastening sections, and an assembly through hole disposed at one of the fastening sections. The adjustable tire pressure detector includes a detector body, a gas intake nozzle, and a gas nozzle assembly member. The detector body is disposed at the fastening sections and includes a housing and a gas nozzle assembly hole penetrating through the housing. The gas nozzle assembly hole includes two parallel limiting contact surfaces and at least one connecting surface connecting the two limiting contact surfaces. The gas intake nozzle includes a coupling section inserted into the gas nozzle assembly hole, and a gas intake section extending from the coupling section towards the assembly through hole. The coupling section includes two compact surfaces corresponding to and tightly pressing against the limiting contact surfaces, at least one abutting contact surface connecting the two compact surfaces and contacting with the connecting surface, and an assembly hole facing the gas nozzle assembly hole. A distance between the two compact surfaces gradually increases from the coupling section towards the gas intake section. The gas nozzle assembly member penetrates through the gas nozzle assembly hole to couple with the assembly hole of the gas intake nozzle, so as to fasten the gas intake nozzle onto the detector body.

In one embodiment, the detector body includes at least one support section extending towards the connection section. Further, the support section includes a buffer member abutting against the connecting section.

In one embodiment, the gas nozzle assembly member further includes an outer screw thread, and the assembly hole includes an inner screw thread for screwing with the outer screw thread.

In one embodiment, the gas intake nozzle includes a limiting fixing section disposed between the coupling section and the gas intake section to engage with the assembly through hole.

In one embodiment, the detector body includes an installation sleeve disposed between gas nozzle assembly hole and the coupling section of the gas intake nozzle. The installation sleeve allows the gas intake nozzle to perform an adjustment movement after being assembled. Further, the installation sleeve includes an assembly end, and the detector body includes an installation portion to couple with the assembly end.

Through the structure of the present invention disclosed above, the adjustable tire pressure detector of the present invention offers the features below:

First of all, through a design that the gas nozzle assembly hole is larger than the coupling section of the gas intake nozzle, the gas intake nozzle is allowed to adjust an appropriate angle when being inserted into the gas nozzle assembly hole. As such, the detector body can be firmly and closely attached to the connecting section of the tire rim to satisfy safety regulations of installing the adjustable tire pressure detector.

Secondly, with the two limiting contact surfaces in the gas nozzle assembly hole, positions of the compact surfaces are limited due to a contact with the limiting contact surfaces, such that the gas intake nozzle is securely fastened onto the detector body.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
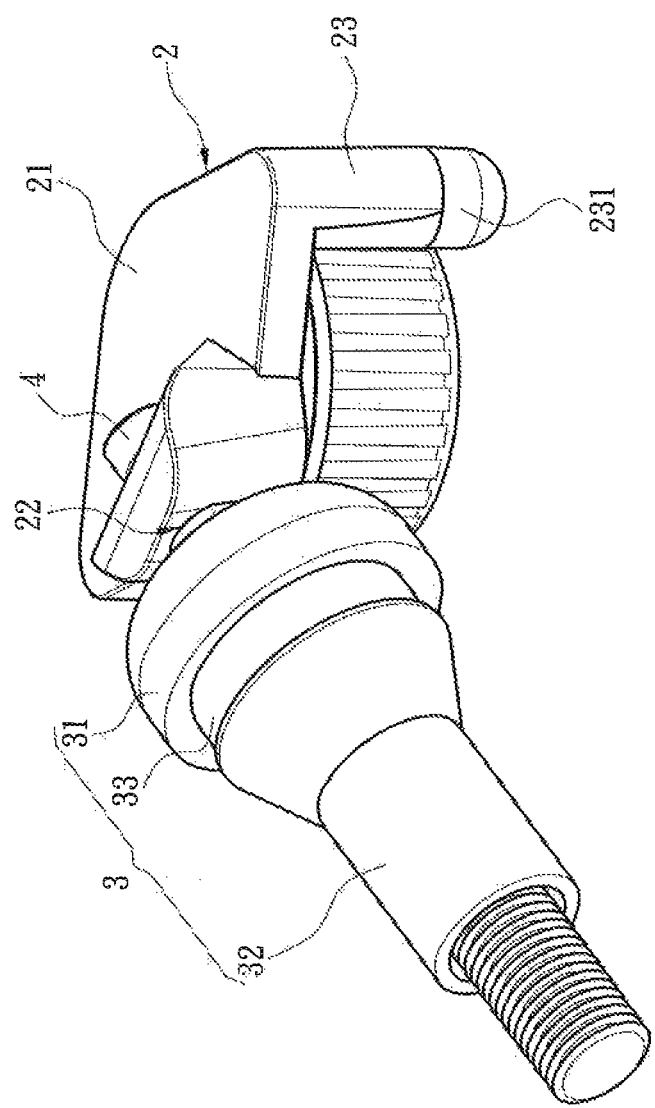
FIG 1 is a schematic view of the adjustable tire pressure detector according to a first embodiment of the present invention.
Figure 2:
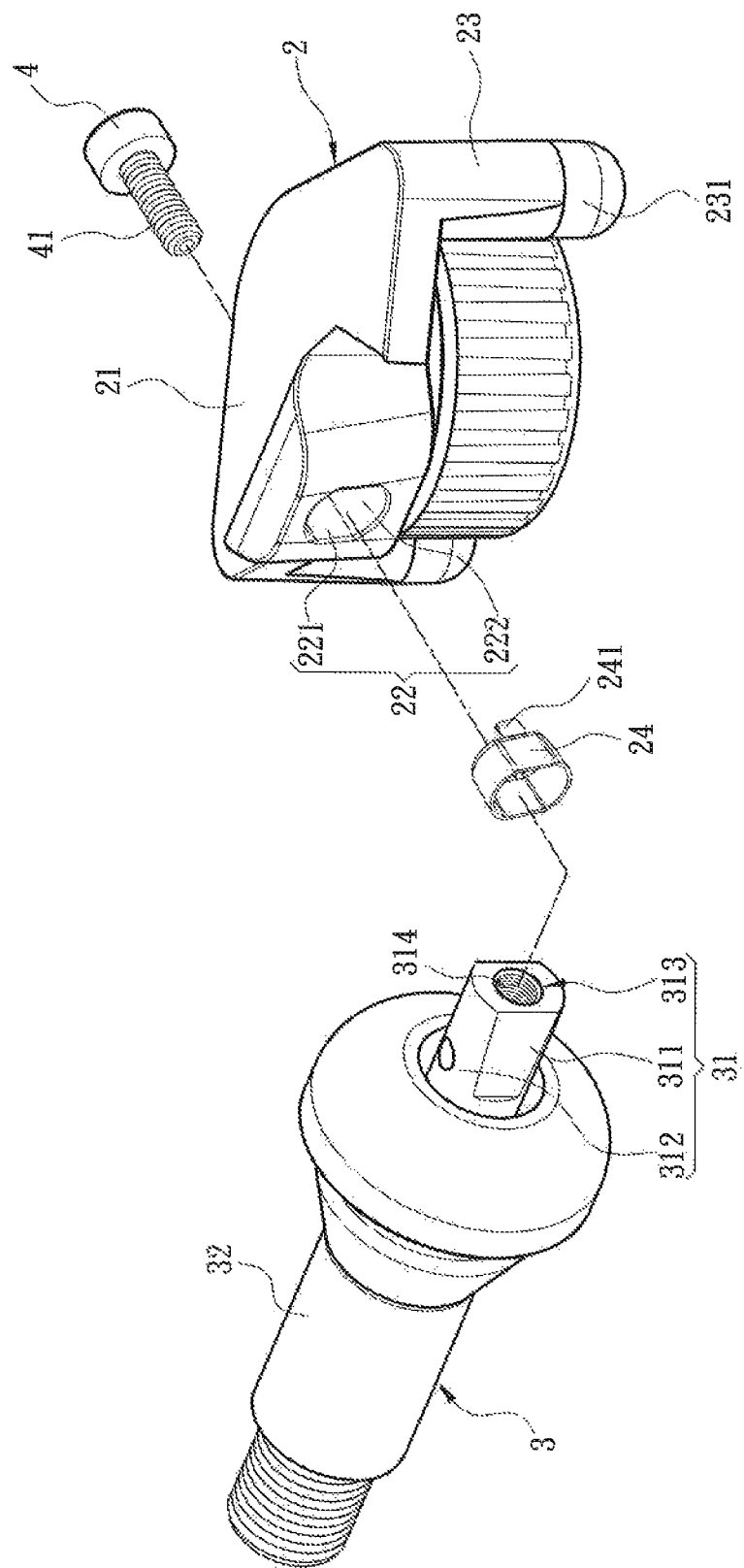
FIG. 2 is an exploded view of the adjustable tire pressure detector according to the first embodiment of the present invention.
Figure 3:
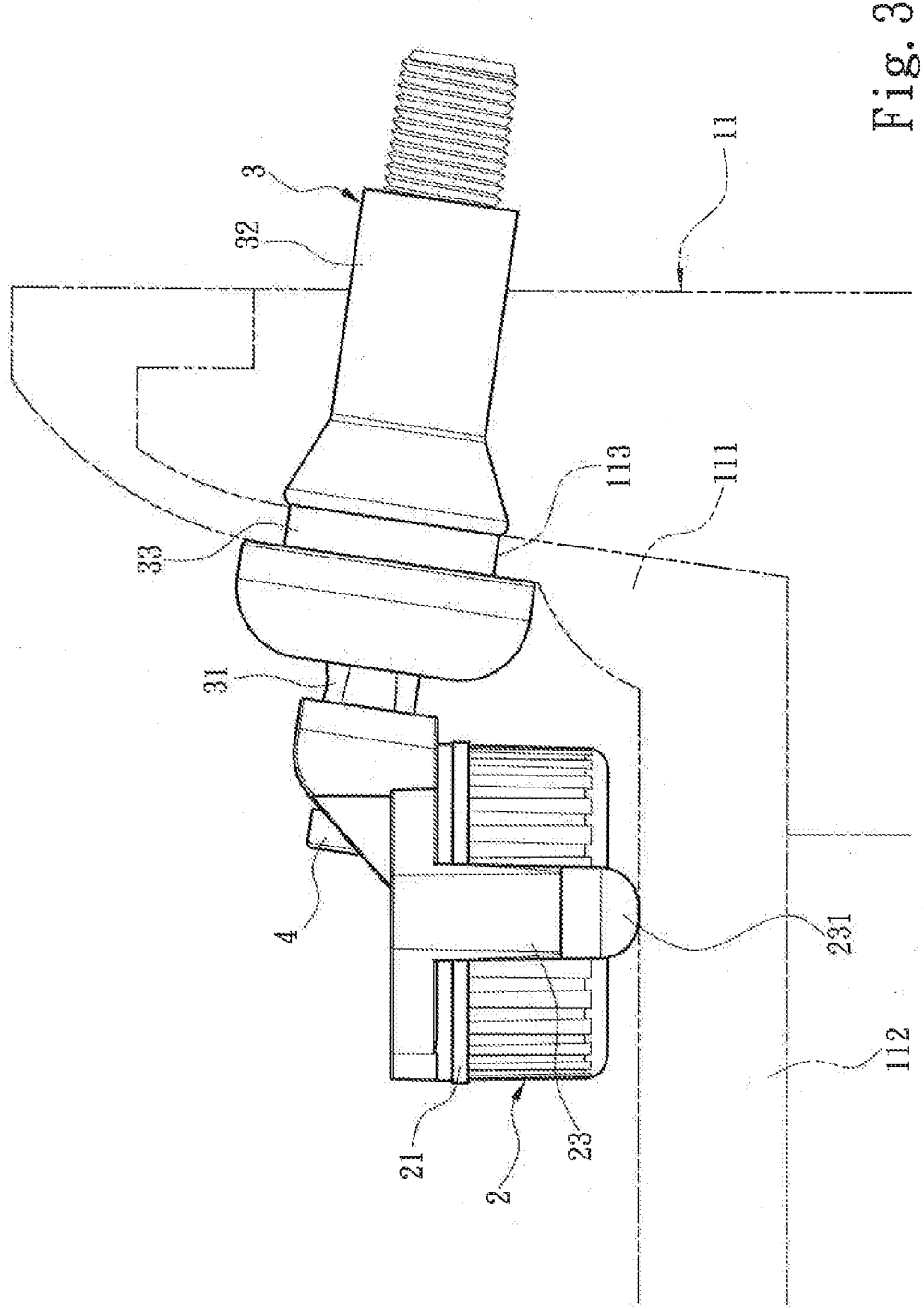
FIG. 3 is a side view of the adjustable tire pressure detector according to the first embodiment of the present invention.
Figure 4A:
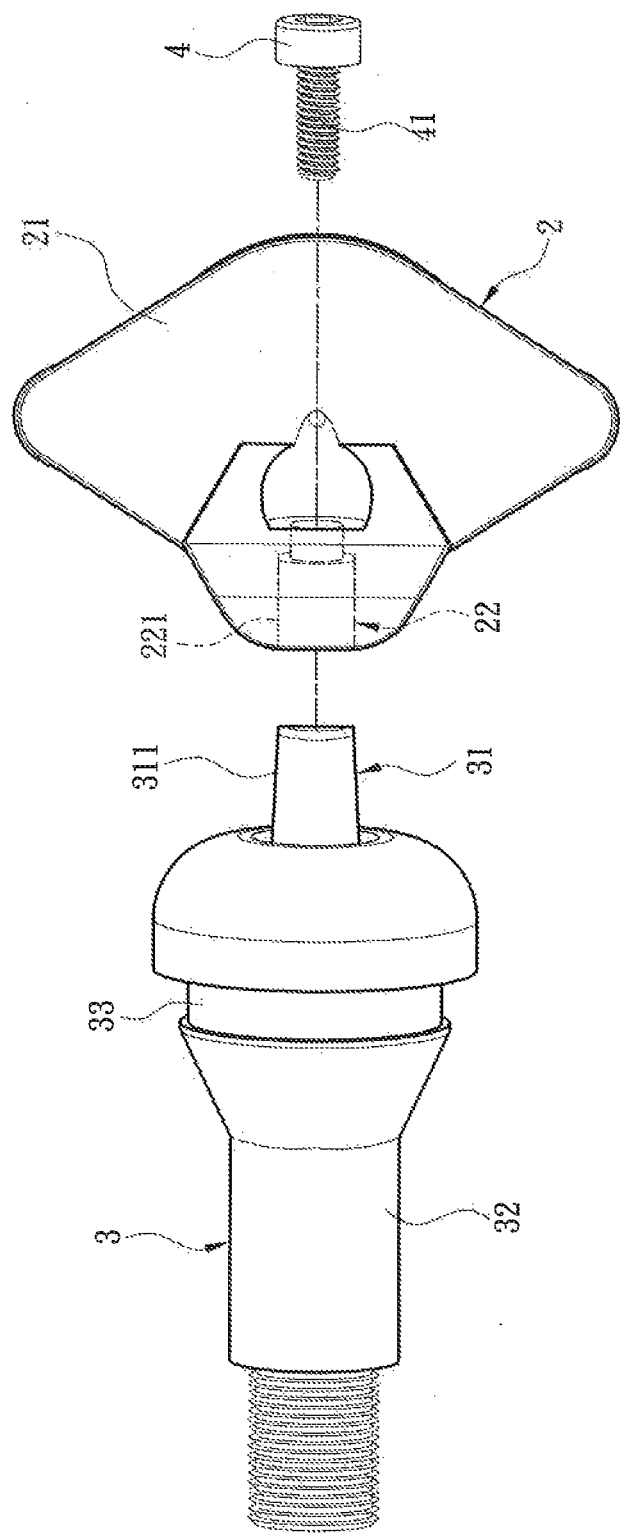
FIG. 4A is a first top view of the adjustable tire pressure detector according to the first embodiment of the present invention.
Figure 4B:
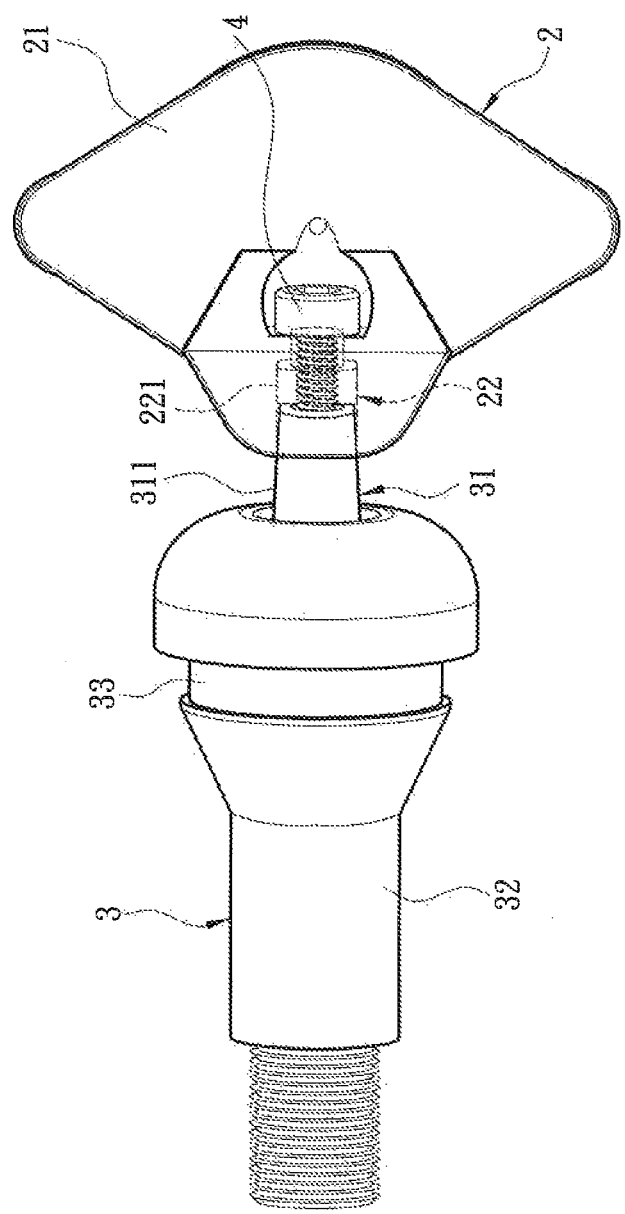
FIG. 4B is a second top view of the adjustable tire pressure detector according to the first embodiment of the present invention.
Figure 5A:
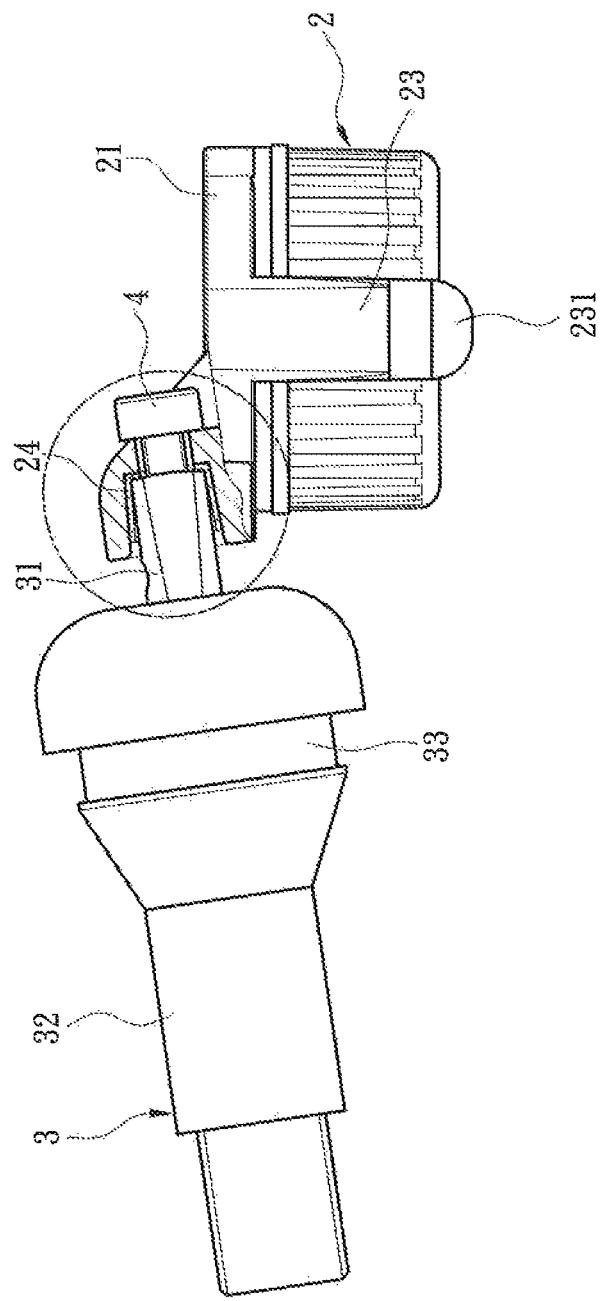
FIG. 5A is another side view of the adjustable tire pressure detector according to the first embodiment of the present invention.
Figure 5B:
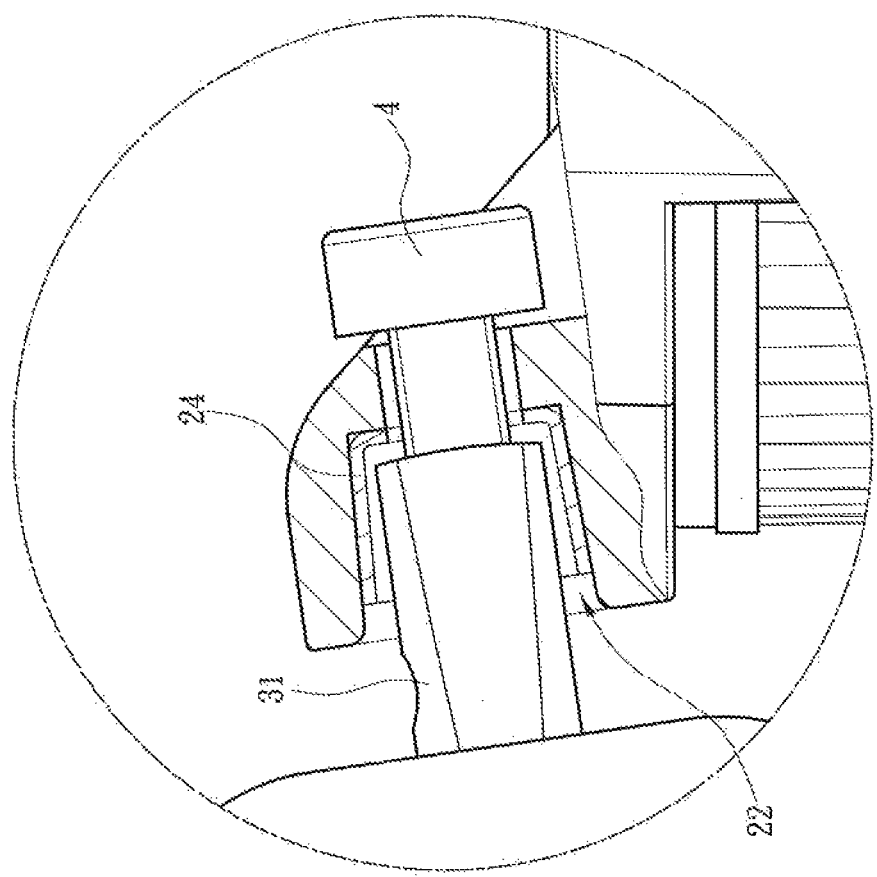
FIG. 5B is an enlarged partial side view of the adjustable tire pressure detector in FIG. 5A according to the first embodiment of the present invention.
Figure 5C:
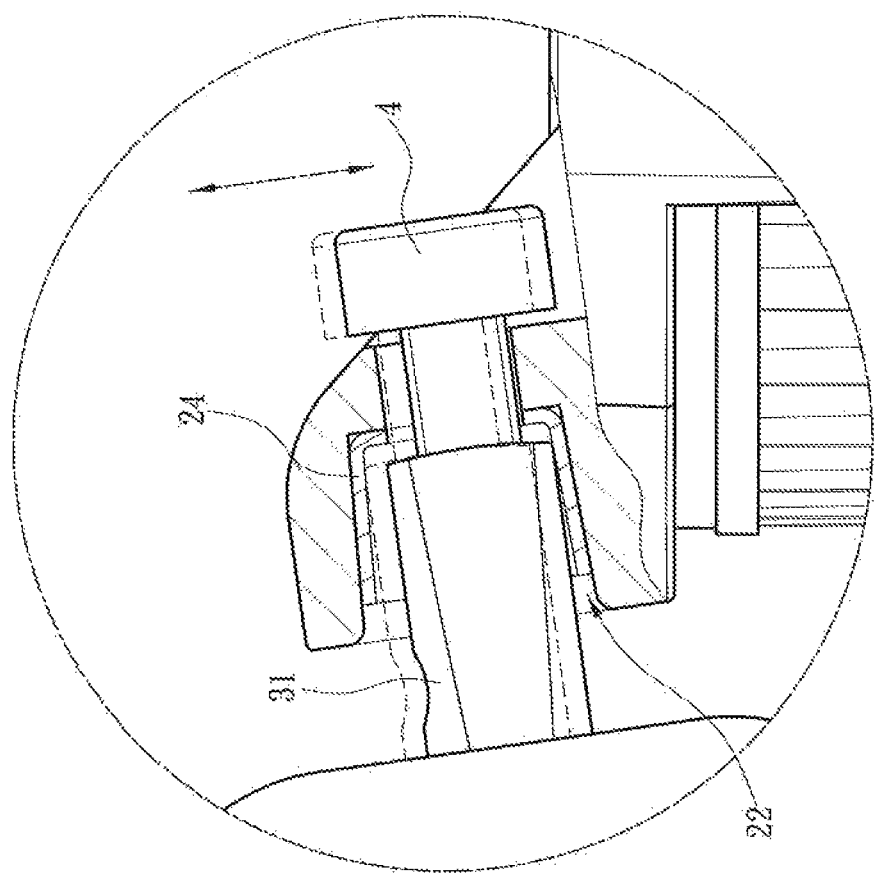
FIG. 5C is another enlarged partial side view of the adjustable tire pressure detector in FIG. 5A according to the first embodiment of the present invention.
Figure 5D:
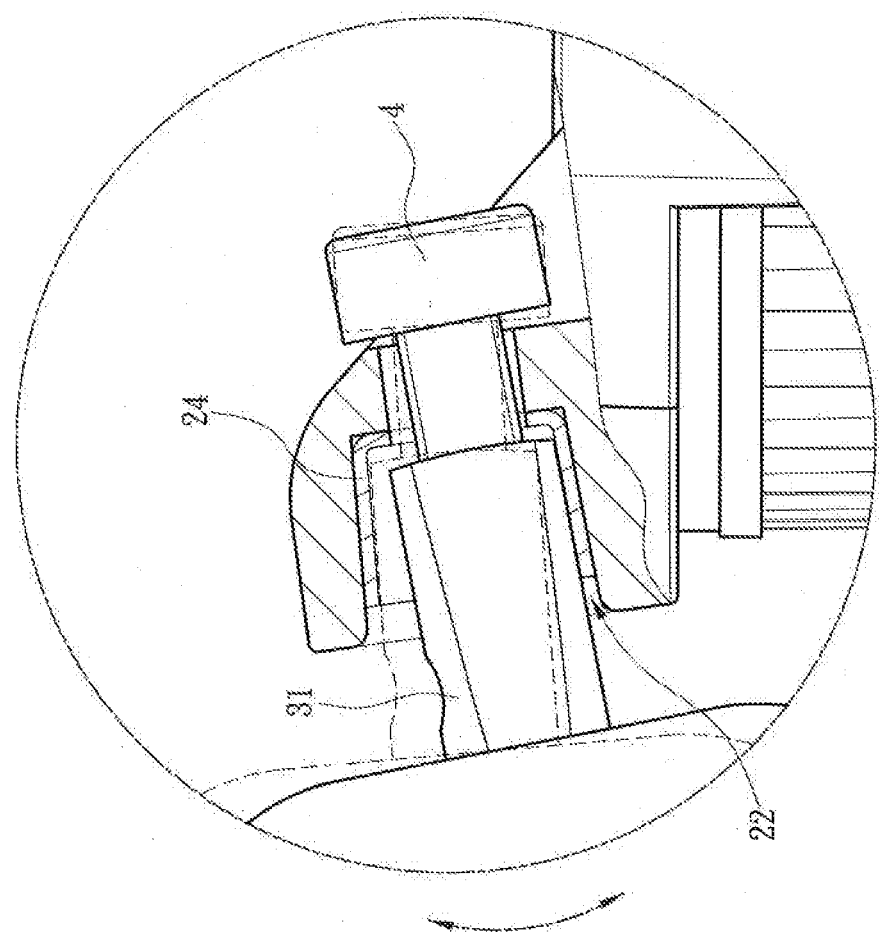
FIG. 5D is the other enlarged partial side view of the adjustable tire pressure detector in FIG 5A according to the first embodiment of the present invention.

Referring to FIGS. 1 to 3, an adjustable tire pressure detector of the present invention is installed on a tire rim 11. The tire rim 11 includes two fastening sections 111 at two sides to engage with a tire bead of a tire (not shown), a connecting section 112 connecting the two fastening sections 111, and an assembly through hole 113 disposed at one of the fastening sections 111. The adjustable tire pressure detector includes a detector body 2, a gas intake nozzle 3, and a gas nozzle assembly member 4. The detector body 2 includes a housing 21 and a gas nozzle assembly hole 22 penetrating through the housing 21. The gas nozzle assembly hole 22, which appears an ellipse shape, includes two parallel limiting contact surfaces 221 and at least one connecting surface 222 connecting the two limiting contact surfaces 221. The gas intake nozzle 3 includes a coupling section 31 inserted into the gas nozzle assembly hole 22, and a gas intake section 32 extending from the coupling section 31 towards the assembly through hole 113. The coupling section 31 includes two compact surfaces 311 corresponding to and tightly pressing against the limiting contact surfaces 221, at least one abutting contact surface 312 connecting the two compact surfaces 311 and contacting with the connecting surface 222, and an assembly hole 313 facing the gas nozzle assembly hole 22. A distance between the two compact surfaces 311 gradually increases from the coupling section 31 towards the gas intake section 32. Further, each of the compact surfaces 311 is formed at a width smaller than that of the limiting contact surface 221, such that an appropriate adjustment can be performed according to a size of the tire rim 11 after inserting the coupling section 31 into the gas nozzle assembly hole 22. The gas nozzle assembly member 4 penetrates through the gas nozzle assembly hole 22 and then couples with the assembly hole 313 of the gas intake nozzle 3, so as to fasten the gas intake nozzle 3 onto the detector body 2.

The detector body 2 further includes a support section 23 extending towards the connecting section 112 to separate the detector body 2 from the tire rim 11 by a distance. The support section 23 includes a buffer member 231 abutting against the connecting section 112. The buffer member 231 is disposed to alleviate the uttering of the tire rim 11 which may damage of the detector body 2 during a driving process. Further, the gas intake nozzle 3 includes a limiting fixing section 33 and a gas outlet through hole. The limiting fixing section 33 is disposed between the coupling section 31 and the gas intake section 32 to engage with the assembly through hole 113. The gas outlet through hole is interconnected with the assembly hole 313 and allows pumping gas to enter the tire. In addition, the gas nozzle assembly member 4 further includes an outer screw thread 41, and the assembly hole 313 includes an inner screw thread 314 for screwing with the outer screw thread 41. Referring to FIGS. 5A to 5D, the detector body 2 further includes an installation sleeve 24 disposed between gas nozzle assembly hole 22 and the coupling section 31 of the gas intake nozzle 3. The installation sleeve 24 allows the gas intake nozzle 3 to perform an adjustment movement after being assembled. The installation sleeve 24 appears similar to a taper shape, such that to only an end portion of the coupling section 31 comes into contact with the installation sleeve 24 after inserting the coupling section 31 into the installation sleeve 24. It should be noted that, when installing the gas intake nozzle 3 on the tire rim 11, the gas intake nozzle 3 is not inserted into the gas nozzle assembly hole 22 by a fixed angle. More specifically the above-mentioned adjustment movement refers to a process that, through the installation sleeve 24, the coupling section 31 of the gas intake nozzle 3 is allowed to move appropriately in the gas nozzle assembly hole 22, such as moving up or down, or swinging up or down, to adjust to a preferred assembly position. The installation sleeve 24 further includes an assembly end 241, and the detector body 2 further includes an installation portion 211 to couple with the assembly end 241. For example, the installation portion 211 may be a through hole.

Exemplary operation details for assembling the adjustable tire pressure detector to the tire rim 11 are given below with reference to FIGS. 4A to 5B. The gas intake nozzle 3 is disassembled into the coupling section 31 and the gas intake section 32. The gas intake section 32 is disposed from an outer side of the tire rim 11 towards an inner side of the tire rim 11, and the coupling section 11 is disposed from the inner side of the tire rim 11 towards the outer side of the tire rim 11, so as to couple the coupling section 31 with the gas intake section 32 from two sides of the assembly through hole 113 and thus fasten the gas intake nozzle 3 onto the tire rim 11. The coupling section 31 is inserted into the gas nozzle assembly hole 22 of the detector body 2, and an assembly angle of the coupling section 31 is adjusted according to a shape of the tire rim 11. As such, the abutting contact surface 312 comes into contact with only one of the connecting surfaces 222, and the compact surfaces 311 is limited and oppressed by the limiting contact surface 211, so as to assemble the gas intake nozzle 3 onto the detector body 2. In the present invention, with a design that the gas nozzle assembly hole 22 is slightly larger than the coupling section 3 of the gas intake nozzle 3, the coupling section 31 is allowed to adjust an assembly angle thereof in the gas nozzle assembly hole 22 to adapt to different type of tire rims 11.

Figure 6:
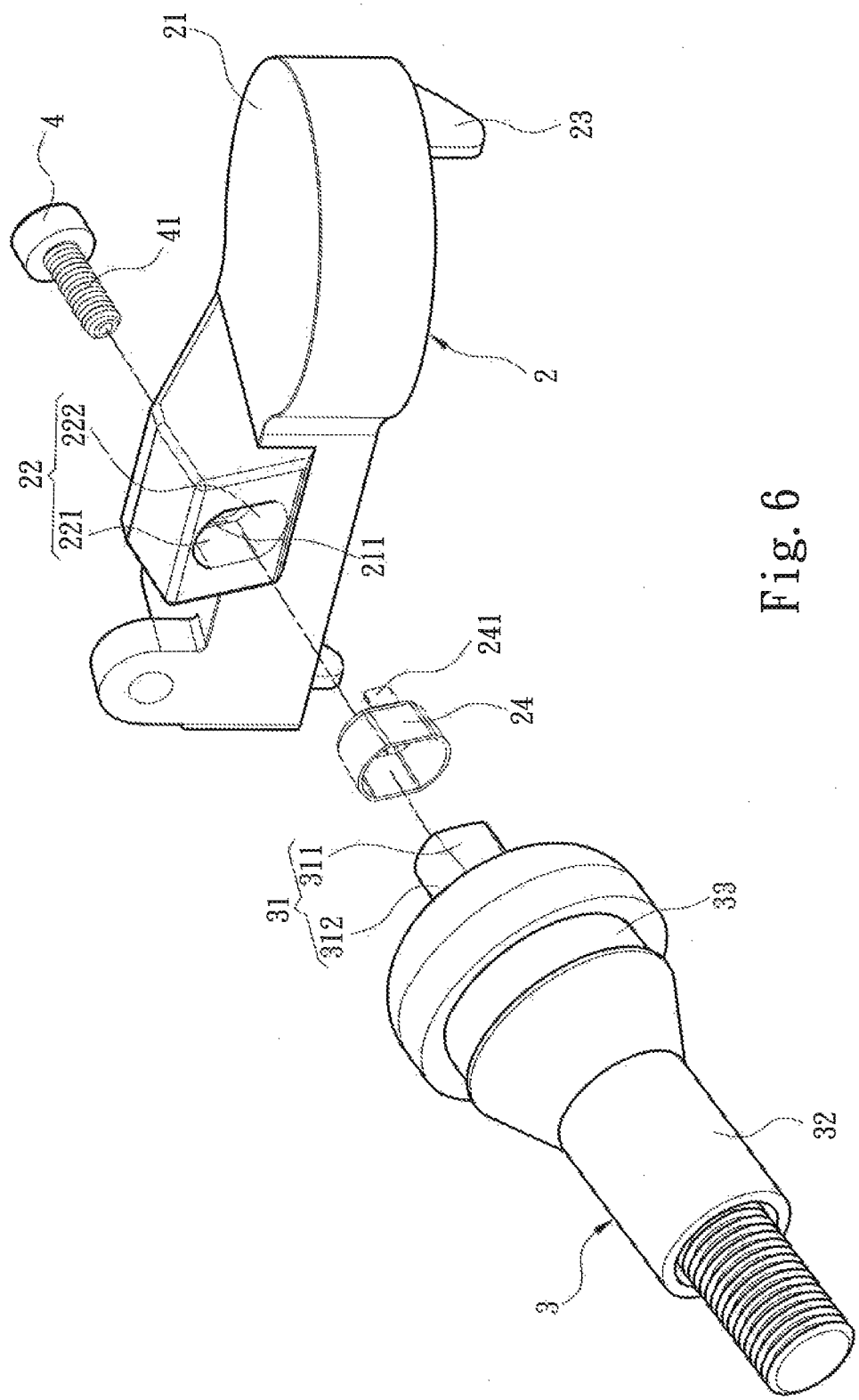
FIG. 6 is an exploded view of the adjustable tire pressure detector according to a second embodiment of the present invention.

Moreover, the detector body 2 of the present invention can also be implemented in a shape as shown in FIG. 6, not limited in the shape of the embodiment as shown in FIG. 1.

In conclusion, an adjustable tire pressure detector of the present invention, installed to a tire rim, includes a detector body, a gas intake nozzle and a gas nozzle assembly member. The detector body includes a housing and a gas nozzle assembly hole. The gas nozzle assembly hole has two parallel limiting contact surfaces, and at least one contact surface connecting the two limiting contact surfaces. The gas intake nozzle includes two compact surfaces respectively corresponding to the limiting contact surfaces to closely pack against the limiting contact surfaces, at least one abutting contact surface connecting the two compact surfaces and contacting with the connecting surface, and an assembly hole facing the gas nozzle assembly hole. A distance between the two compact surfaces gradually increases from the coupling section towards the inlet section. The gas nozzle assembly member is assembled to the assembly hole of the gas intake nozzle to fasten the gas intake nozzle onto the detector body. Thus, the adjustable tire pressure detector of the present invention may be installed to tire rims of different sizes.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An adjustable tire pressure detector installed on a tire rim, the tire rim including two fastening sections at two sides to engage with a tire bead of a tire, a connecting section connecting the two fastening sections, and an assembly through hole disposed at one of the fastening sections, the adjustable tire pressure detector comprising:
    a detector body, disposed at the fastening sections, comprising:
        a housing; and
        a gas nozzle assembly hole, penetrating through the housing, comprising two parallel limiting contact surfaces and at least one connecting surface connecting the two limiting contact surfaces;
    a gas intake nozzle, comprising:
        a coupling section, inserted into the gas nozzle assembly hole, comprising two compact surfaces corresponding to and tightly pressing against the limiting contact surfaces, at least one abutting contact surface connecting the two compact surfaces and contacting with the connecting surface, and an assembly hole facing the gas nozzle assembly hole; and
        a gas intake section extending from the coupling section towards the assembly through hole, wherein a distance between the two compact surfaces gradually increases from the coupling section towards the gas intake section; and
    a gas nozzle assembly member, penetrating through the gas nozzle assembly hole to couple with the assembly hole of the gas intake nozzle to fasten the gas intake nozzle onto the detector body.

2. The adjustable tire pressure detector of claim 1, wherein the detector body comprises at least one support section extending towards the connecting section.

3. The adjustable tire pressure detector of claim 2, wherein the support section comprises a buffer member abutting against the connecting section.

4. The adjustable tire pressure detector of claim 1, wherein the gas nozzle assembly member comprises an outer screw thread, and the assembly hole comprises an inner screw thread for screwing with the outer screw thread.

5. The adjustable tire pressure detector of claim 1, wherein the gas intake nozzle comprises a limiting fixing section disposed between the coupling section and the gas intake section to engage with the assembly through hole.

6. The adjustable tire pressure detector of claim 1, wherein the detector body comprises an installation sleeve disposed between the gas nozzle assembly hole and the coupling section of the gas intake nozzle to allow the gas intake nozzle to perform an adjustment movement after being assembled.

7. The adjustable tire pressure detector of claim 6, wherein the installation sleeve comprises an assembly end, and the detector body comprises an installation portion to couple with the assembly end.

* * * * *